US012549591B2

(12) United States Patent
Kairali et al.

(10) Patent No.: US 12,549,591 B2
(45) Date of Patent: Feb. 10, 2026

(54) NETWORK INTRUSION PREVENTION IN EDGE COMPUTING ENVIRONMENTS

(71) Applicant: International Business Machines Corporation, Armonk, NY (US)

(72) Inventors: Sudheesh S. Kairali, Kozhikode (IN); James David Cleaver, Grose Wold (AU); Binoy Thomas, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 18/178,579

(22) Filed: Mar. 6, 2023

(65) Prior Publication Data

US 2024/0305662 A1 Sep. 12, 2024

(51) Int. Cl.
*H04L 9/40* (2022.01)

(52) U.S. Cl.
CPC ...... *H04L 63/1441* (2013.01); *H04L 63/0236* (2013.01); *H04L 63/1416* (2013.01)

(58) Field of Classification Search
CPC ............. H04L 63/1441; H04L 63/0236; H04L 63/1416
See application file for complete search history.

(56) References Cited

U.S. PATENT DOCUMENTS

| 8,707,432 | B1 | 4/2014 | Rathi |
| 9,536,087 | B2 | 1/2017 | Rubin |
| 2019/0125455 | A1* | 5/2019 | Shelton, IV ............. A61B 5/00 |
| 2020/0162503 | A1* | 5/2020 | Shurtleff ............. H04L 41/0894 |

(Continued)

FOREIGN PATENT DOCUMENTS

CN 111371730 B 11/2021

OTHER PUBLICATIONS

"System and method for continuous trust validation of devices in an IOT environment", An IP.com Prior Art Database Technical Disclosure, Authors et. al.: Disclosed Anonymously, IP.com No. IPCOM000255023D, IP.com Electronic Publication Date: Aug. 27, 2018, 6 pages.

(Continued)

*Primary Examiner* — Vu V Tran
(74) *Attorney, Agent, or Firm* — Stosch Sabo

(57) ABSTRACT

Computer-implemented methods, systems and program products extending traditional cloud-centric intrusion detection to edge networks. NIDPS is decentralized between the edge and cloud. Edge gateways equipped with NIDPS agents capture packets of network traffic and pre-process the data. Pre-processing output is compressed and sent to cloud intrusion detection services equipped with latest available rules and signatures. As cloud IDS detects security threats using rules and signatures, NIDPS agents are alerted and switched from "lazy mode" to "preventative mode." While in preventative mode, NIDPS agents inspect packets of network traffic in accordance with the rules and signatures associated with the detected security threat, dropping packets that trigger the rules and signatures, while still compressing and transmitting other packets to cloud IDS for analysis. Once no active rules or signatures are enforced for pre-set or configured periods of time, NIDPS agents revert back to "lazy mode" to conserve network resources.

16 Claims, 8 Drawing Sheets

(56) References Cited

U.S. PATENT DOCUMENTS

| | | | |
|---|---|---|---|
| 2021/0144517 A1 | 5/2021 | Guim Bernat | |
| 2023/0188540 A1* | 6/2023 | Valluri | H04L 63/145 |
| | | | 726/22 |
| 2023/0269305 A1* | 8/2023 | Mestery | H04L 67/34 |
| | | | 709/217 |

OTHER PUBLICATIONS

"Threat Detection and Mitigation Among Edge Devices", An IP.com Prior Art Database Technical Disclosure, Authors et. al.: Disclosed Anonymously, IP.com No. IPCOM000269825D, IP.com Electronic Publication Date: May 13, 2022, 5 pages.

Almogren, A.S., "Intrusion Detection in Edge-of-Things computing", Journal of Parallel and Distributed Computing (2019), doi:https://doi.org/10.1016/j.jpdc.2019.12.008, 17 pages.

Alsafi et al., "IDPS: An Integrated Intrusion Handling Model for Cloud Computing Environment", Published 2012, <https://arxiv.org/ftp/arxiv/papers/1203/1203.3323.pdf>, 18 pages.

Chellam et al., "Intrusion Detection in Computer Networks using Lazy Learning Algorithm", ScienceDirect, Procedia Computer Science 132 (2018) pp. 928-936.

Kumar et al., "Intrusion detection and prevention system for an IoT environment", Digital Communications and Networks, https://doi.org/10.1016/j.dcan.2022.05.027, Received Sep. 23, 2020; Received in revised form May 27, 2022; Accepted May 29, 2022, Available online Jun. 16, 2022, 12 pages.

Lin et al., "Fair Resource Allocation in an Intrusion Detection System for Edge Computing", IEEE Consumer Electronics Magazine, Digital Object Identifier 10.1109/MCE.2018.2851723, Date of publication: Oct. 9, 2018, 6 pages.

* cited by examiner

NETWORK INTRUSION PREVENTION IN EDGE COMPUTING ENVIRONMENTS

BACKGROUND

The present disclosure relates generally to edge computing environments and network security. More specifically, the present disclosure extends intrusion detection of traditional cloud-centric edge computing environment using Network Intrusion Detection and Prevention Systems (NIPDS) as an extension of network gateways within the edge environment.

NIDPS may be a type of security software that monitors a computer network for malicious activity and blocks any of the detected threats. NIDPS can use various techniques to protect the computer network, such as signature matching, anomaly detection and behavioral analysis to identify and prevent cyber attacks such as viruses, malware and/or unauthorized access. In edge computing, NIDPS can be used to enhance the security of edge devices and protect against cyber threats that may impact their operation. Edge devices, such as internet-of-things (IoT) devices and sensors, often have limited computing power and storage, and may not be able to run traditional security software. NIDPS in edge computing can provide real-time protection against security threats, without relying on centralized security systems, by monitoring and analyzing network traffic at the edge.

In IoT applications, sensor nodes collect and send data to a gateway using a wireless connection. The gateway receiving the collected data forwards the data to cloud servers via the Internet or another type of network. Latest trends in edge computing focus on extending cloud computing and IoT functionalities to the edge of the network. As IoT applications and sensors extend IoT and cloud computing to the edges of the network, methods for preventing cyber-attacks at the edges of the network are more frequently being deployed. However, edge nodes of a network suffer from resource limitations. Namely, computation and storage capabilities are limited within the edge environment. Such limitations on resources at the edge make NIDPS challenging. Resource allocation becomes more difficult to balance. Having NIDPS running in a preventative mode, performing deep packet inspection all of the time on the network traffic becomes too resource intensive for the resource constraints experienced within edge networks. Moreover, requiring NIDPS agents at each of the edge computing systems to pull the latest rules and signatures can be unnecessary in situations with multiple edge services being available. Not all edge computing systems of the network will need to have all of the rules and signatures pulled from the cloud and stored at the edge. Accordingly, there is a need for systems, methods and computer program products that conserve resources by dynamically engaging in more stringent intrusion detection at the edge computing environment as needed, when violations are detected; selectively enforcing sets of rules provided by the cloud to the edge for a limited period of time.

SUMMARY

Embodiments of the present disclosure relate to computer-implemented methods, associated computer systems and computer program products for extending Network Intrusion Detection and Prevention Systems (NIDPS) to edge networks. The computer-implemented method comprises the steps of capturing packets of network traffic reaching gateways of the edge network equipped with an NIDPS agent. The NIDP agent is placed into a first mode, minimizing pre-processor output of the NIDPS agent. The NIDPS agent pre-processes the packets of network traffic and compresses output of the pre-preprocessing of the packets using a lossless compression. Compressed, pre-processed packets of the network traffic are transmitted by the NIDPS agent to a cloud intrusion detection service (IDS). Upon detection of a security threat by the cloud IDS, the NIDPS agent receives an alert indicating possible rules being violated and a set of rules or signatures from the cloud IDS. The NIDPS switches from the first mode to a second mode. While in the second mode, the NIDPS agent prevents transmission of certain types of packets corresponding to the set of rules or signatures passing through the gateway.

Embodiments may optionally further include the NIDPS agent, while in the second mode, inspecting the packets of the network traffic and matching one or more of the packets of the network traffic to the set of rules or signature. Based on the matching of the one or more packets of network traffic to the set of rules or signatures, the NIDPS agent drops the matching packet.

In some optional embodiments the NIDPS agent may be placed into the second mode for a configurable interval of time, whereby upon the NIDPS agent not matching one or more of the packets of network traffic to the set of rules or signatures, or the cloud IDS alerting the NIDPS agent of possible rules being violated for the configurable interval of time, NIDPS agent switches from the second mode back to the first mode.

Optionally, in some embodiments, the edge network can include a plurality of gateways positioned within a common location or region, along with a plurality of NIDPS agents assigned to monitor the packets of network traffic passing through the plurality of gateways. Upon a threshold number of the plurality of NIDPS agents switching from the first mode to the second mode, all nearby NIDPS agents within the common location or region of the edge network may preventatively switch to the second mode and each of the NIDPS agents switched into the second mode receives the set of rules or signatures being broadcasted out to the NIDPS agents by the cloud IDS.

In some embodiments, the edge network can include a single NIDPS agent operating as the NIDPS agent for both a first gateway and a second gateway. As the NIDPS agent switches between being placed in the first mode or the second mode, the selected mode of the NIDPS agent is applied to both the first gateway and the second gateway, allowing the NIDPS agent to share and apply the set of rules or signatures from the cloud IDS to both the network traffic of the first gateway and the second gateway.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
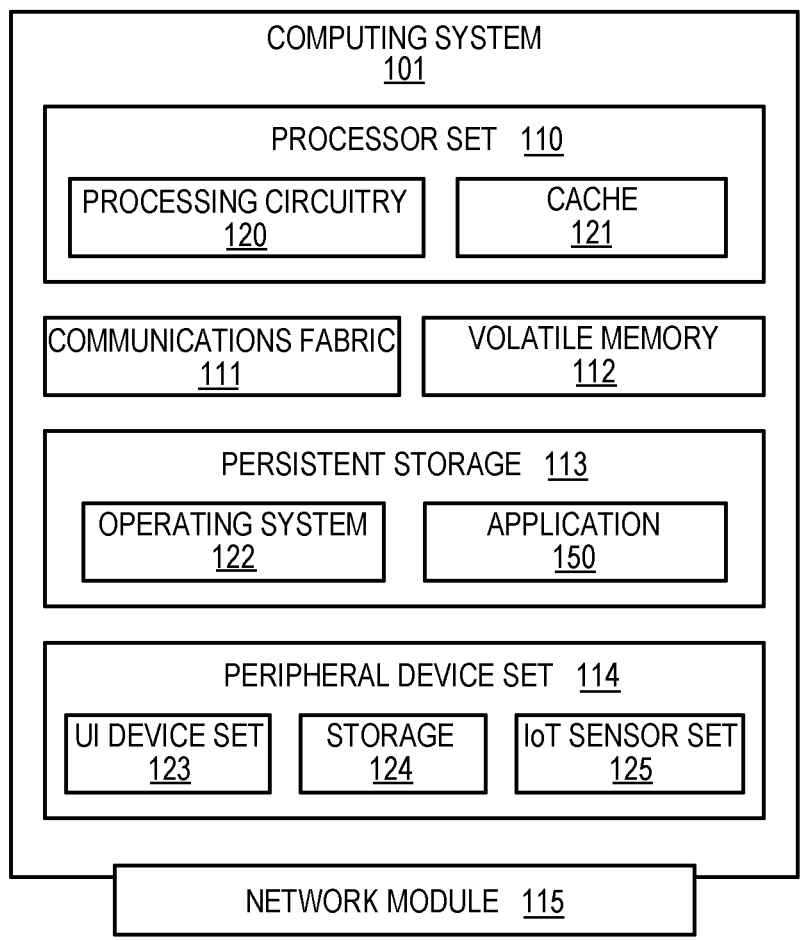
FIG. 1 depicts a block diagram illustrating an embodiment of a computer system and the components thereof, upon which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Traditional cloud intrusion-detection systems (IDS) are used to mitigate cyber security threats at the edge computing environment of a network. Gateways of the edge network forward data from the edge to cloud servers via the internet. However, since computational and storage capabilities experience limitations in the edge nodes of the network, conducting efficient NIDPS is challenging given the resource constraints. Embodiments of the present disclosure recognize that due to the constraints on resource allocation at the edge computing environment of a network, it is not practical or efficient to run NIPDS at each of the edge nodes in a mode that is continuously pulling the latest rules and signatures from cloud servers. Particularly when an edge environment is providing multiple edge services. Not all of the edge devices would need access to all of the rules or signatures continuously being updated.

Embodiments of the present disclosure recognize there is a need for providing NIDPS at the edge network and conducting NIPDS in a manner that balances the conservation of resource allocation with the ability to prevent active security threats on the network. Embodiments of the present disclosure achieve this balance between resource conservation and threat detection by extending NIDPS to the edge network while dynamically adjusting the role of NIDPS based on the threats detected using cloud IDS. NIDPS agents operating as a function of an edge gateway may be capable of changing modes dynamically. A first mode, referred to herein as a "lazy mode" may operate as a default mode, when there are no active security threats identified. While operating in this first "lazy" mode, NIDPS agents minimize their capability to generate pre-processor output and may be limited to a set of common pre-processors that may be configurable by the administrator or architect of the edge network.

While NIPDS agents of the gateway are placed in the first mode, NIDPS agents may capture packets of network traffic being received at the respective gateway monitored by the NIDPS agent. The packets of network traffic captured by the NIDPS agent can be pre-processed, compressed and streamed to the cloud IDS, which preforms the detection of the security threats using the pre-processed packets of network traffic at the cloud; relieving the NIDPS agent from having to continuously inspect every packet at the gateway and determine whether the packets are a security threat. In some networks, NIDPS agents operating in a first mode may be even further constrained due to the amount of available network resources. In a network-constrained mode of operation, pre-processing of data packets may be reduced to generation of an IDS log that is provided to the cloud IDS for detection of active security threats. A cloud IDS receiving the compressed output from the NIDPS agent, may decompress the pre-processed packets, actively analyze the packets and detect security threats by matching the pre-processed output from the NIDPS agent to the latest rule sets and signatures stored by the cloud IDS. Upon detection or one or more security threats, the NIDPS agent may be alerted about the security threats being detected. Embodiments of the NIDPS agent may be switched from the first mode to a second mode of operation, and the NIDPS agent may receive a primary set of rules that were possibly violated by the detected security threat.

Embodiments of the NIDPS agent placed into the second mode, may actively enforce the primary set of rules and signatures on specific types of packets that may be received at the gateway. NIDPS agents may use the primary set of rules and signatures to inspect the incoming packets received by the gateway of the edge network. While placed in the prevention mode, packets of network traffic matching the primary set of rules and signatures may be dropped and will not be pre-processed by the NIDPS agent. In some embodiments of the NIDPS agent may conduct deep packet inspection (DPI) within the edge environment to further protect the edge network from specific types of threats that may be associated with the detected security threats. While packets matching the primary set of rules and signatures may be dropped and prevented from being pre-processed, the remaining packets of network traffic being received by the gateway may continue to be pre-processed, compressed and transmitted to the cloud IDS for further detection of security threats and new, active rules to enforce at the gateway.

Embodiments of the NIDPS agent may continue to remain in the second mode (i.e., "preventative mode") for at least a threshold interval of time, which can be configured by the network administrator, architect or other user with authorization to configure the NIDPS agent. During the threshold interval of time, the NIDPS agent and/or cloud IDS may determine whether or not any active rules have been sent to the NIDPS agent, and/or whether or not any packets have been dropped by the NIDPS agent during the threshold interval of time. In instances where the NIDPS agent has not dropped any packets for the threshold interval of time and/or no new active rules associated with a detected security threat have been forwarded to the NIDPS agent for implementation during the threshold interval of time, the NIDPS agent may revert back to the first mode of operation.

It should be noted that in some embodiments, edge computing environments may include physically collocated gateways. A single NIDPS agent may be shared by two or more gateways and admins of the edge network may assign the single NIDPS agent to conduct NIDPS processes discussed herein across multiple gateways. Under such circumstances where an NIDPS agent is assigned to multiple gateways, the NIDPS agent may synchronize changes in mode across all gateways being served by the NIDPS agent and may share and apply active rules and signatures for one gateway to another gateway being served by the same NIDPS agent. For example, if cloud IDS detects a potential security threat at a first gateway being monitored by an NIDPS agent and the cloud IDS transmits a primary set of rules or signatures for enforcement by the NIDPS agent at the first gateway in prevention mode, the NIDPS agent may also apply the same primary set of rules and signatures received from the cloud IDS at a second gateway being monitored by the same NIDPS agent as the first gateway.

In some embodiments, cloud IDS can track the operating mode of all the gateways running a NIDPS agent. Edge networks may be tied to a specific region, locality or area and a plurality of gateways may make up the edge network. If one or more NIDPS agents enter into prevention mode, cloud IDS may conduct an analysis of the location, region or area served by the edge network. For example, if a threshold number of NIDPS agents is at least three, once three NIDPS agents within the same edge network are switched to prevention mode, cloud IDS may analyze the types of active rules or signatures being matched to packets of network traffic that are triggering the NIDPS agent to change modes. Cloud IDS may identify whether the detected issues at each of the gateways having an NIDPS agent placed in prevention mode have common rules or signatures being enforced. In response to a threshold number of NIDPS agents enforcing active rules or signatures that are in common for the detected threats, cloud IDS may broadcast these rules or signatures to all the gateways within the location, region or area served by the edge network. NIDPS agents in the first mode (i.e., lazy mode or network-constrained mode) may switch to the second mode (i.e., prevention mode) and begin enforcing the rules or signatures broadcasted by the cloud IDS.

Computing System

Various aspects of the present disclosure are described by narrative text, flowcharts, block diagrams of computer systems and/or block diagrams of the machine logic included in computer program product (CPP) embodiments. With respect to any flowcharts, the operations can be performed in a different order than what is shown in the flowchart. For example, two operations shown in successive flowchart blocks may be performed in reverse order, as a single integrated step, concurrently, or in a manner at least partially overlapping in time. A computer program product embodiment ("CPP embodiment") is a term used in the present disclosure that may describe any set of one or more storage media (or "mediums") collectively included in a set of one or more storage devices. The storage media may collectively include machine readable code corresponding to instructions and/or data for performing computer operations. A "storage device" may refer to any tangible hardware or device that can retain and store instructions for use by a computer processor. Without limitation, the computer readable storage medium may include an electronic storage medium, a magnetic storage medium, an optical storage medium, an electromagnetic storage medium, a semiconductor storage medium, a mechanical storage medium, and/or any combination thereof. Some known types of storage devices that include mediums referenced herein may include a diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination thereof.

A computer-readable storage medium should not be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As understood by those skilled in the art, data is typically moved at some occasional points in time during normal operations of a storage device, such as during access, de-fragmentation or garbage collection. However, such movement of the data during operations does not render the storage device as transitory because the data is not transitory while it is stored.

FIG. 1 illustrates a block diagram describing an embodiment of a computing system 101 operating within a computing environment 100. The computing system 101 may be a simplified example of a computing device (i.e., a physical bare metal system and/or a virtual system) capable of performing the computing operations described herein. Computing system 101 may be representative of the one or more computing systems or devices implemented in accordance with the embodiments of the present disclosure and further described below in detail. Computing system 101 as depicted in FIG. 1 (and FIG. 2) provides only an illustration of one implementation of a computing system 101 and does not imply any limitations regarding the environments in which different embodiments may be implemented. In general, the components illustrated in the computing system 101 may be representative of an electronic device, either physical or virtualized, that is capable of executing machine-readable program instructions.

Embodiments of computing system 101 may take the form of a desktop computer, laptop computer, tablet computer, smart phone or other type of mobile communications device, smart watch or other wearable computer such as a virtual reality headset, augmented reality headset, glasses or wearable accessory. Embodiments of the computing system 101 may also take the form of a mainframe computer, server, quantum computer, a non-conventional computer system such as an autonomous vehicle or home appliance, and/or any other form of computer or mobile device now known or to be developed in the future that is capable of running an application 150, accessing a network 102 or querying a database, such as remote database 130. Performance of a computer-implemented method executed by a computing system 101 may be distributed among multiple computers and/or between multiple locations. Computing system 101 may be located as part of a cloud network, even though it is not shown within a cloud in FIGS. 1-2. Moreover, computing system 101 is not required to be part of a cloud network except to any extent as may be affirmatively indicated.

Processor set 110 can include one or more computer processors of any type now known or to be developed in the future. Processing circuitry 120 may be distributed over multiple packages. For example, multiple, coordinated integrated circuit chips. Processing circuitry 120 may implement multiple processor threads and/or multiple processor cores. Cache 121 may refer to memory that is located on the processor chip package(s) and/or may be used for data or code that can be made available for rapid access by the threads or cores running on processor set 110. Cache 121 memories can be organized into multiple levels depending upon relative proximity to the processing circuitry 120. Alternatively, some, or all of cache 121 of processor set 110 may be located "off chip." In some computing environments, processor set 110 may be designed for working with qubits and performing quantum computing.

Computer readable program instructions can be loaded onto computing system 101 to cause a series of operational steps to be performed by processor set 110 of computing system 101 and thereby implement a computer-implemented method. Execution of the instructions can instantiate the methods specified in flowcharts and/or narrative descriptions of computer-implemented methods included in this specification (collectively referred to as "the inventive methods"). The computer readable program instructions can be stored in diverse types of computer readable storage media, such as cache 121 and the other storage media discussed herein. The program instructions, and associated data, can be accessed by processor set 110 to control and direct performance of the inventive methods. In computing environments of FIGS. 1-2, at least some of the instructions for performing the inventive methods may be stored in persistent storage 113, volatile memory 112, and/or cache 121, as application (s) 150 comprising one or more running processes, services, programs and installed components thereof. For example, program instructions, processes, services and installed components thereof may include installation of NIDPS agents 307 onto edge gateways 303 of an edge network 301 and/or cloud IDS 309 installed onto a cloud 305 network such as public cloud 105 or private cloud 106.

Communication fabric 111 may refer to signal conduction paths that may allow the various components of computing system 101 to communicate with each other. For example, communications fabric 111 can provide for electronic communication among the processor set 110, volatile memory 112, persistent storage 113, peripheral device set 114 and/or network module 115. Communication fabric 111 can be made of switches and electrically conductive paths that make up busses, bridges, physical input/output ports and the like. Other types of signal communication paths may be used, such as fiber optic communication paths and/or wireless communication paths.

Volatile memory 112 may refer to any type of volatile memory now known or to be developed in the future, and may be characterized by random access, but this is not required unless affirmatively indicated. Examples include dynamic type random access memory (RAM) or static type RAM. In computing system 101, the volatile memory 112 is located in a single package and can be internal to computing system 101, but, alternatively or additionally, the volatile memory 112 may be distributed over multiple packages and/or located externally with respect to computing system 101. Application 150, along with any program(s), processes, services, and installed components thereof, described herein, may be stored in volatile memory 112 and/or persistent storage 113 for execution and/or access by one or more of the respective processor sets 110 of the computing system 101.

Persistent storage 113 can be any form of non-volatile storage for computers that may be currently known or developed in the future. The non-volatility of this storage means that the stored data may be maintained regardless of whether power is being supplied to computing system 101 and/or directly to persistent storage 113. Persistent storage 113 may be a read only memory (ROM), however, at least a portion of the persistent storage 113 may allow writing of data, deletion of data and/or re-writing of data. Some forms of persistent storage 113 may include magnetic disks, solid-state storage devices, hard drives, flash-based memory, erasable read-only memories (EPROM) and semi-conductor storage devices. Operating system 122 may take several forms, such as various known proprietary operating systems or open-source Portable Operating System Interface type operating systems that employ a kernel.

Peripheral device set 114 includes one or more peripheral devices connected to computing system 101. For example, via an input/output (I/O interface). Data communication connections between the peripheral devices and the other components of computing system 101 may be implemented using various methods. For example, through connections using Bluetooth, Near-Field Communication (NFC), wired connections or cables (such as universal serial bus (USB) type cables), insertion type connections (for example, secure digital (SD) card), connections made though local area communication networks and/or wide area networks such as the internet. In various embodiments, UI device set 123 may include components such as a display screen, speaker, microphone, wearable devices (such as glasses, googles, headsets, smart watches, clip-on, stick-on or other attachable devices), keyboard, mouse, joystick, printer, touchpad, game controllers, and haptic feedback devices. Storage 124 can include external storage, such as an external hard drive, or insertable storage, such as an SD card. Storage 124 may be persistent and/or volatile. In some embodiments, storage 124 may take the form of a quantum computing storage device for storing data in the form of qubits. In some embodiments, networks of computing systems 101 may utilize clustered computing and/or utilize storage components as a single pool of seamless resources when accessed through a network by one or more computing systems 101. For example, a storage area network (SAN) that is shared by multiple, geographically distributed computer systems 101 or network-attached storage (NAS) applications. IoT sensor set 125 can be made up of sensors that can be used in Internetof-Things applications. For example, a sensor may be a temperature sensor, motion sensor, light sensor, infrared sensor or any other type of known sensor type.

Network module 115 may include a collection of computer software, hardware, and/or firmware that allows computing system 101 to communicate with other computer systems through a computer network 102, such as a LAN or WAN. Network module 115 may include hardware, such as modems or Wi-Fi signal transceivers, software for packetizing and/or de-packetizing data for communication network transmission, and/or web browser software for communicating data over the network. In some embodiments, network control functions and network forwarding functions of network module 115 are performed on the same physical hardware device. In other embodiments (for example, embodiments that utilize software-defined networking (SDN)), the control functions and the forwarding functions of network module 115 can be performed on physically separate devices, such that the control functions manage several different network hardware devices or computing systems 101. Computer readable program instructions for performing the inventive methods can be downloaded to computing system 101 from an external computer or external storage device through a network adapter card or network interface which may be included as part of network module 115.

Figure 2:
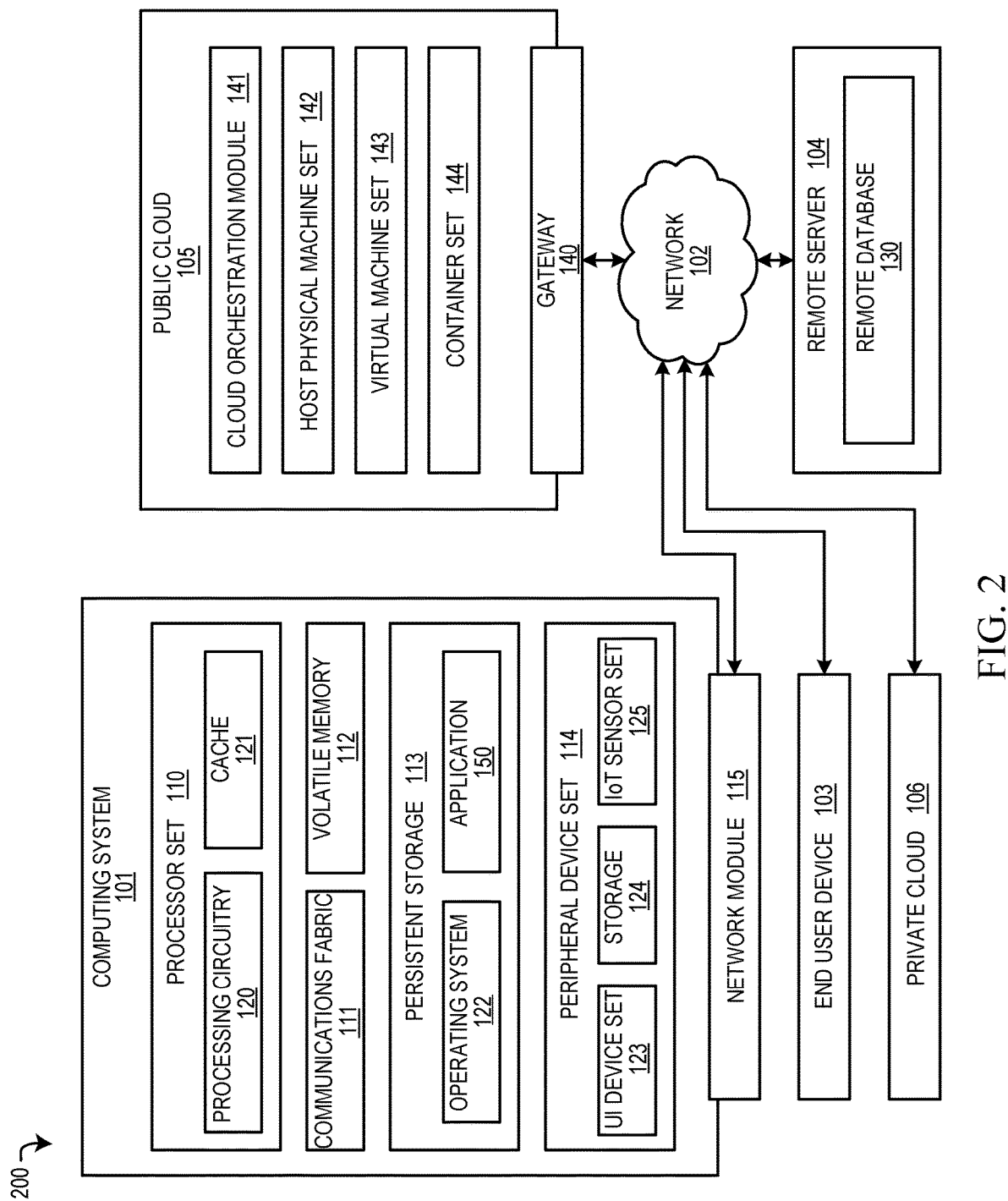
FIG. 2 depicts a block diagram illustrating an extension of the computing system environment of FIG. 1, wherein the computer systems are configured to operate in a network environment (including a cloud environment), and perform methods described herein in accordance with the present disclosure.

FIG. 2 depicts a computing environment 200 which may be an extension of the computing environment 100 of FIG. 1, operating as part of a network 102. In addition to computing system 101, computing environment 200 can include a computing network 102 such as a wide area network (WAN) (or another type of computer network) connecting computing system 101 to one or more end user device (EUD) 103, remote server 104, public cloud 105, and/or private cloud 106. In this embodiment, computing system 101 includes processor set 110 (including processing circuitry 120 and cache 121), communication fabric 111, volatile memory 112, persistent storage 113 (including operating system 122 and application(s) 150, as identified above), peripheral device set 114 (including user interface (UI) device set 123, storage 124, Internet of Things (IoT) sensor set 125), and network module 115. Remote server 104 includes remote database 130. Public cloud 105 can include gateway 140, cloud orchestration module 141, host physical machine set 142, virtual machine set 143, and/or container set 144.

Network 102 may be comprised of wired or wireless connections. For example, connections may be comprised of computer hardware such as copper transmission cables, optical transmission fibers, wireless transmission, routers, firewalls, switches, gateway computers and/or edge servers. Network 102 may be described as any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. Other types of networks that can be used to interconnect the various computing systems 101, end user devices 103, remote servers 104, private cloud 106 and/or public cloud 105 may include Wireless Local Area Networks (WLANs), home area network (HAN), cellular networks, backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 101.

End user device 103 can include any computer device that can be used and/or controlled by an end user (for example, a customer of an enterprise that operates computing system 101) and may take any of the forms discussed above in connection with computing system 101. EUD 103 may receive helpful and useful data from the operations of computing system 101. For example, in a hypothetical case where computing system 101 is designed to provide a recommendation to an end user, this recommendation may be communicated from network module 115 of computing system 101 through network 102 to EUD 103. In this example, EUD 103 can display, or otherwise present, the recommendation to an end user. In some embodiments, EUD 103 may be a client device, such as thin client, thick client, mobile computing device such as a smart phone, mainframe computer, desktop computer and so on.

Remote server 104 may be any computing system that serves at least some data and/or functionality to computing system 101. Remote server 104 may be controlled and used by the same entity that operates computing system 101. Remote server 104 represents the machine(s) that collect and store helpful and useful data for use by other computers, such as computing system 101. For example, in a hypothetical case where computing system 101 is designed and programmed to provide a recommendation based on historical data, the historical data may be provided to computing system 101 from remote database 130 of remote server 104.

Public cloud 105 may be any computing systems available for use by multiple entities that provide on-demand availability of computer system resources and/or other computer capabilities including data storage (cloud storage) and computing power, without direct active management by the user. The direct and active management of the computing resources of public cloud 105 can be performed by the computer hardware and/or software of cloud orchestration module 141. The computing resources provided by public cloud 105 can be implemented by virtual computing environments that run on various computers making up the computers of host physical machine set 142, and/or the universe of physical computers in and/or available to public cloud 105. The virtual computing environments (VCEs) may take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through network 102.

VCEs can be stored as "images." A new active instance of the VCE can be instantiated from the image. Two types of VCEs may include virtual machines and containers. A container is a VCE that uses operating-system-level virtualization, in which the kernel allows the existence of multiple isolated user-space instances, called containers. These isolated user-space instances may behave as physical computers from the point of view of applications 150 running in them. An application 150 running on an operating system 122 can utilize all resources of that computer, such as connected devices, files and folders, network shares, CPU power, and quantifiable hardware capabilities. Applications 150 running inside a container of container set 144 may only use the contents of the container and devices assigned to the container, a feature which may be referred to as containerization.

Private cloud 106 may be similar to public cloud 105, except that the computing resources may only be available for use by a single enterprise. While private cloud 106 is depicted as being in communication with network 102 (such as the Internet), in other embodiments a private cloud 106 may be disconnected from the internet entirely and only accessible through a local/private network. A hybrid cloud may refer to a composition of multiple clouds of distinct types (for example, private, community or public cloud types), and the plurality of clouds may be implemented or operated by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 may be both part of a larger hybrid cloud environment.

System for Extending NIDPS to an Edge Network

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 3:
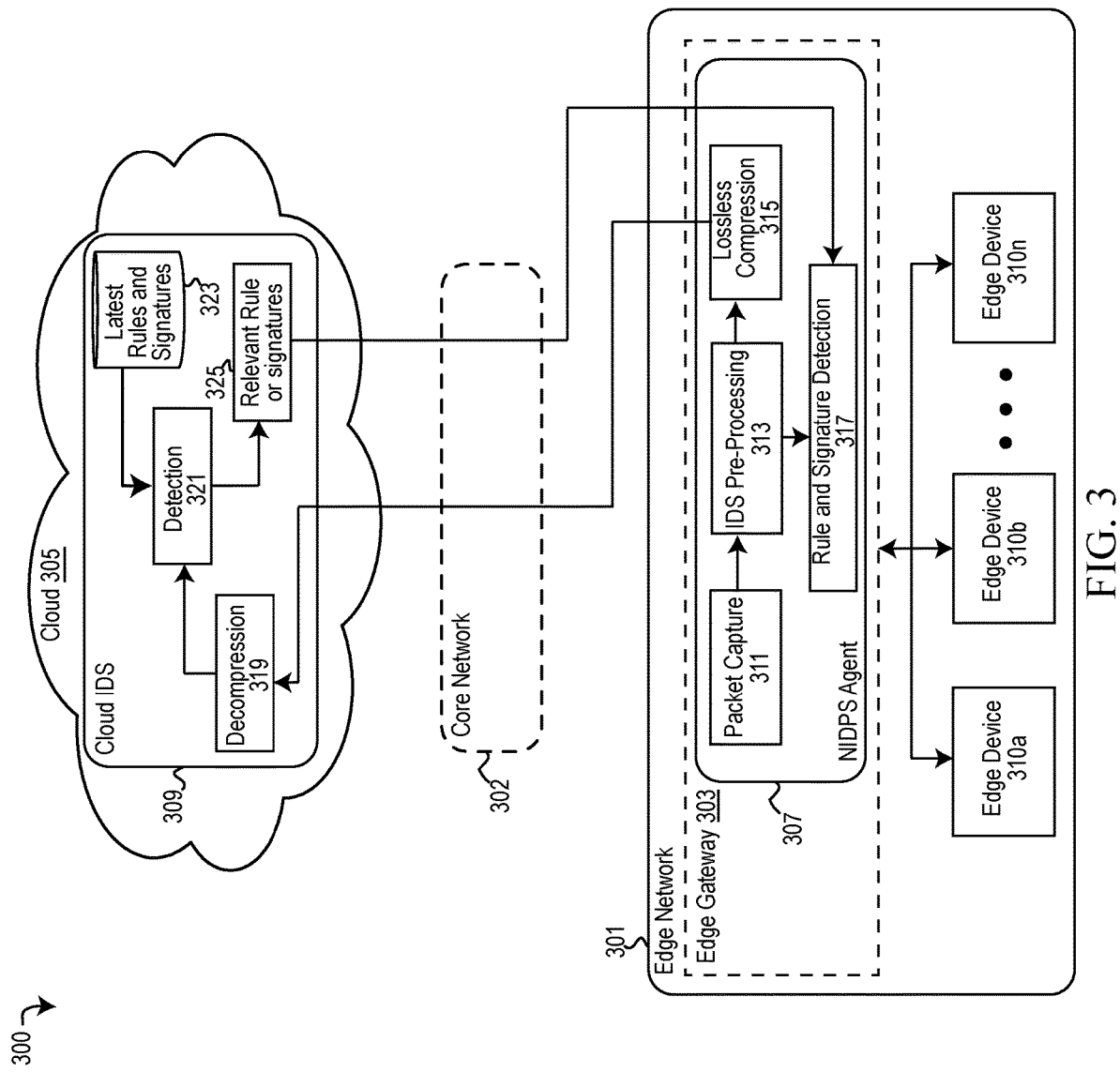
FIG. 3 depicts a functional block diagram describing an embodiment of a system for extending NIDPS to an edge network in a manner that conserves resources of the edge network, in accordance with the present disclosure.

Referring to the drawings, FIG. 3 depicts an embodiment of a computing environment 300 capable of extending protections of NIDPS to the edge network(s) 301, enhancing the security of edge devices 310a-310n (referred to herein generally as edge devices 310) against cyber threats that may impact the operation of edge devices 310, while dynamically conserving resources of the edge network 301. As shown in FIG. 3, embodiments of the computing environment 300 can include an edge network 301 comprising at least one edge gateway 303 running an NIDPS agent 307. The edge gateway 303 may be placed in communication with a cloud 305 running intrusion detection services (cloud IDS 309) via core network 302. Embodiments of core network 302 connecting cloud 305 to edge network 301, may operate as a bridge between the cloud 305 and the edge network 301, transmitting data generated by edge devices 310 to the cloud 305 for further processing, storage, and analysis. The core network 302 can also receive commands and data from the cloud 305, transmitting the commands and data to the edge devices 310 as needed. Core network 302 may include high-speed, high-capacity switches and routers, as well as communication links such as fiber optic cables, wired or wireless networks, cellular networks, satellite networks and/or microwave links such as point-to-point (P2P) radio signal transmission used to transport mobile data.

Edge network 301 may be described as a type of network architecture that brings computation and data storage closer to the devices (i.e., edge devices 310) and users that generate or consume the data. Edge networks 301 may reduce latency, bandwidth and costs associated with transmitting data over long distances while also improving performance and reliability of data-intensive applications. This is achieved because data processing and storage can be performed by the edge network 301 near the edge devices 310, enabling real-time analysis and decision-making, reducing the amount of data needed to be transmitted back to centralized processing systems and services located in cloud 305, such as cloud IDS 309. As shown in FIG. 3, edge network 301 may include a plurality of edge devices 310. An edge device 310 may refer to devices or systems connected to the edge network 301 for the purpose of transmitting, processing and/or storing data. Examples of edge device 310 may include sensor devices, camera devices, IoT devices, industrial control systems (ICS), robotic devices, medical devices, point-of-sale systems and consumer electronic devices such as smartphones, laptops, and gaming consoles.

Embodiments of the edge network 301 may further comprise one or more edge gateways 303 or servers. Edge gateway 303 of edge network 301 may refer to a device or system that can act as an intermediary between the edge devices 310 and the core network 302. Embodiments of edge gateway 303 may have a primary function of performing data processing tasks at the edge of the network, reducing the amount of data needing to be transmitted over the network to a centralized location, such as cloud 305. Edge gateway 303 can perform pre-processing tasks such as data filtering, data compression, data aggregation, and data normalization, as well as deploy security applications or functions. In the computing environment shown in FIG. 3, security applications and functions deployed at the edge gateway 303 may be performed by an NIDPS agent 307. While the NIDPS agent 307 is shown in FIG. 3 as running on edge gateway 303, an NIDPS agent 307 is not necessarily limited to being run on an edge gateway 303. An NIDPS agent 307 may refer to a software component that runs on a device in a network such as server, gateway or end user devices in order to monitor and protect the network from network traffic being generated by those devices. NIDPS agent 307 may be capable of analyzing incoming and outgoing network traffic, looking for patterns or anomalies that may indicate a security threat based on the current operating mode of the NIDPS agent 307 (as discussed herein). For example, while placed in a "preventative mode," NIDPS agent 307 can take a variety of actions, such as blocking the traffic, dropping packets matching particular rules or signatures provided by Cloud IDS 309, sending an alert to an administrator, or quarantining an affected device.

Embodiments of NIDPS agent 307 can include a plurality of components which may implement one or more functions, processes or tasks of the NIDPS agent 307. The components of the NIDPS agent may include (but are not limited to) packet capture 311, IDS pre-processing 313, lossless compression 315 outputted from IDS pre-processing 313 and rule and signature detection 317. Packet capture 311, may refer to a feature or component of the NIDPS agent 307 that may be responsible for allowing NIDPS agent 307 to capture and analyze network traffic in real-time (depending on the current mode NIDPS agent 307 is operating in). Packet capture 311 may implement packet capture technology to intercept network traffic flowing through the edge network 301 via the edge gateway 303. While an NIDPS agent 307 is operating in a first mode (referred throughout this disclosure as "lazy mode" or "network-constrained mode") packets intercepted by packet capture 311 may be sent to IDS pre-processing 313 without further inspection. However, while operating in a second mode, (referred to throughout this application as "preventative mode"), packet capture 311 may be capable of performing deep packet inspection, allowing the NIDPS agent 307 to examine contents of each packet, including headers, payloads and other data in order to identify security threats. As discussed below in greater detail, by analyzing network traffic at the packet level using sets of rules and signatures provided by cloud IDS 309, NIDPS agent 307 can detect a wide range of security threats matched to the rules and signatures, including malware, network attacks and data theft. Once a security threat is detected by packet capture 311 while operating in the preventative mode, NIDPS agent can take a variety of actions to mitigate the threat, such as blocking the traffic or dropping the packets that were intercepted. Preventing the packets from being pre-processed by IDS pre-processing 313.

Embodiments of IDS pre-processing 313 may refer to one or more components of the NIDPS agent 307 of the edge network 301 that may be responsible for performing initial processing of the data packets captured by packet capture 311 before the packets of network traffic are sent to a central location, such as cloud IDS 309 for further analysis consistent with the latest rules and signatures 323. Functions or tasks of IDS pre-processor 313 may include data compression, data filtering, data aggregation and/or data normalization. Data compression can be used by NIDPS agent 307 to compress the data from the captured packets before transmission to the cloud IDS 309 in order to reduce the size, making transmission of the compressed packets of network traffic faster and more efficient. Data filtering allows IDS pre-processing 313 to remove irrelevant data such as noise or redundant information before compressing and transmitting the packets of network traffic to cloud IDS 309. Data aggregation may refer to a function of IDS pre-processing 313 that may be aggregating multiple data streams into a single stream of compressed data, reducing the amount of data needing to be transmitted by NIDPS agent 307 to cloud IDS 309. In some embodiments, IDS pre-processing 313 may perform data normalization during the pre-processing phase of the NIDPS agent 307. During data normalization IDS pre-processing may convert the data from the captured network packets into a standard format used by the NIDPS agent 307 and/or the cloud IDS 309, making it easier for the cloud IDS 309 to analyze the network traffic data packets and compare with the packets of network traffic to the latest rules and signatures 323 in order to identify potential security threats. By pre-processing and compressing the data packets intercepted by packet capture 311 before transmitting to cloud IDS 309 for further analysis, the NIDPS agent 307 reduces the amount of data needed to be transmitted over the network, helping to conserve bandwidth and minimize latency.

Embodiments of IDS pre-processing 313 may generate output in the form of lossless compression 315 of the pre-processed packets of network traffic captured by packet capture 311. The lossless compression 315 outputted by IDS pre-processing 313 may refer to the pre-processed data packets compressed using a type of data compression that allows for the original data of the captured data packets to be reconstructed exactly into the uncompressed form without loss of information or quality. Pre-processed packets of network traffic can be compressed and transmitted from NIDPS agent to cloud IDS 309 without any difference in the information content, visual quality or other aspects of data once cloud IDS 309 decompresses the pre-processed packets of network traffic. Lossless compression algorithms implemented by IDS pre-processing 313 can apply lossless compression algorithms that operate by removing redundancy from the data. For example, a packet of network traffic containing repeated sequences of data can be compressed by storing those sequences once and using a reference to those sequences in the compressed file outputted by IDS pre-processing 313.

Embodiments of NIDPS agent 307 may store and reference a portion of the rules and signatures maintained by latest rules and signatures 323 database of cloud IDS 309 for the purpose of preventing security threats while NIDPS agent 307 is placed in prevention mode. Rules and signatures stored by the rule and signature detection 317 component may be provided to the NIDPS agent 307 by the cloud IDS 309 upon detection of potential security threats identified by the cloud IDS 309 during the analysis of decompressed pre-processed packets of network traffic transmitted by NIDPS agent 307 to cloud IDS. In response to security threats identified by cloud IDS 309, a primary set of rules and signatures can be sent to NIDPS agent 307 for storage and local detection of threats at the edge gateway 303 during the use of prevention mode by the NIDPS agent 307. NIDPS agent 307 may use the primary set of rules and signatures applied by rule and signature detection 317 to detect security threats and take one or more actions to prevent the security threat from proceeding to other portions of the network. The active set of rules may define the rules and conditions that trigger an alert or response from the NIDPS agent 307. For example, a rule may specify that any attempt to access a network resource using an unauthorized username and password should trigger an alert and cause the NIDPS agent 307 to drop the packet from the flow of network traffic. Rules can be based on various criteria, such as the source or destination of network traffic, the type of data being transmitted, or specific patterns or sequences of data. Signatures may be referred to as predefined patterns that are used to identify known security threats, such as malware, viruses, and network attacks. Signatures may be created and maintained by security experts and may be updated at the cloud IDS 309 on a regular basis to reflect the latest threats. When cloud IDS 309 detects a potential threat related to a particular signature of the latest rules and signatures 323 database, an up-to-date version of the signature can be sent to rule and signature detection 317 of the NIDPS agent 307 for enforcement while the NIDPS agent 307 is placed in preventative mode.

While operating in preventative mode, when NIDPS agent 307 intercepts network traffic, rule and signature detection 317 may be responsible for matching the packets of the network traffic to the primary set of rules or signatures provided to the NIDPS agent 307 by cloud IDS 309. The primary set(s) of rules or signatures received from cloud IDS 309 may be stored in a database maintained by the rule and signature detection 317 component of the NIDPS agent 307.

If a match is found between the packet of network traffic and one or more active rules or signatures being enforced by NIDPS agent 307 placed in preventative mode, NIDPS agent 307 may implement an appropriate action. For example, upon detection of a packet that matches an active rule or signature being enforced by the NIDPS agent 307 at the edge gateway 303, the NIDPS agent 307 may block the network traffic associated with the packet from using the edge gateway 303, dropping or omitting the packet(s) from transmission, sending an alert to an administrator of the edge network 301, and/or quarantining the edge device 310 that may be response for sending the packet across the edge network 301 from the rest of the edge devices 310 or other edge gateways 303 of the network.

Embodiments of cloud IDS 309 may refer to a cloud service operating within cloud 305 to actively provide intrusion detection services for one or more edge networks 301. Cloud IDS 309 may be tasked with detecting potential security threats by analyzing the pre-processed data packets collected at the edge gateway 303 and if any security threats are detected, further identifying corresponding rules or signatures from the latest rules and signatures 323 database that is available to cloud IDS 309. Cloud IDS 309 may also be responsible for transferring those active sets of rules and signatures to the rule and signature detection 317 component of the NIDPS agent 307 for enforcement at the edge gateway 303. As shown in FIG. 3, the output of IDS pre-processing 313 as lossless compression 315 of the packet data is transmitted over core network 302 to cloud IDS 309. Decompression 319 component of cloud IDS 309 decompresses the packets of network traffic back into its uncompressed form or a standard format provided by IDS pre-processing 313.

In some embodiments of cloud IDS 309, the uncompressed packets of network traffic data is inspected and analyzed by the detection 321 component of cloud IDS 309. Detection 321 performs functions, tasks or processes of cloud IDS 309 associated with detecting security threats, intrusions, viruses, malware or other types of threats to the edge network 301. Detection 321 inspects the pre-processed packets collected by NIDPS agent 307 and analyzes the packets for signs of known or potential security threats and attempts to match the packets to known security threats and signatures stored by latest rules and signatures 323 database. These rules and signatures stored by cloud IDS 309 may be designed to detect known security threats, including malware, viruses and network attacks. If a match is found by detection 321, cloud IDS 309 flags the network traffic as a potential security threat and outputs an identification of the relevant rules or signatures 325 for enforcement at the edge gateway 303 by the NIDPS agent 307.

In response to outputting relevant rule or signatures 325, cloud IDS 309 may transmit signals over the core network 302 alerting the NIDPS agent 307 of potential security threats and may instruct the NIDPS agent 307 to change from a first "lazy" mode to a second "preventative" mode. The signal may include a message identifying the relevant rules or signatures the NIDPS agent 307 should be actively applying to network traffic at the edge gateway 303. In some embodiments, the NIDPS agent 307 may be instructed to remain in the second mode to actively detect and prevent security threats at the edge network 301 for at least a threshold interval of time. The threshold interval of time may be a minimum period of time wherein, if no incoming threats are further identified based on the primary set of active relevant rules or signatures 325 communicated to the rule and signature detection 317 of the NIDPS agent 307 at the edge gateway 303, and/or no new sets of active relevant rules or signatures 325 are identified for enforcement by the cloud IDS 309 at the edge gateway 303 by NIDPS agent 307, the NIDPS agent 307 may revert back to the first mode of operation. For example, if an NIDPS agent 307 is placed in preventative mode and the threshold interval of time is at least 30 minutes without detecting a threat based on the rules or signatures forward from cloud IDS 309 and no new sets of rules or signatures are provided to the NIDPS agent 307 for at least 30 mins, NIDPS agent 307 may return to the first "lazy" mode of operation, wherein NIDPS agent 307 is no longer conducting packet inspection and matching of packets to the rules or signatures at the edge network 301.

Figure 4:
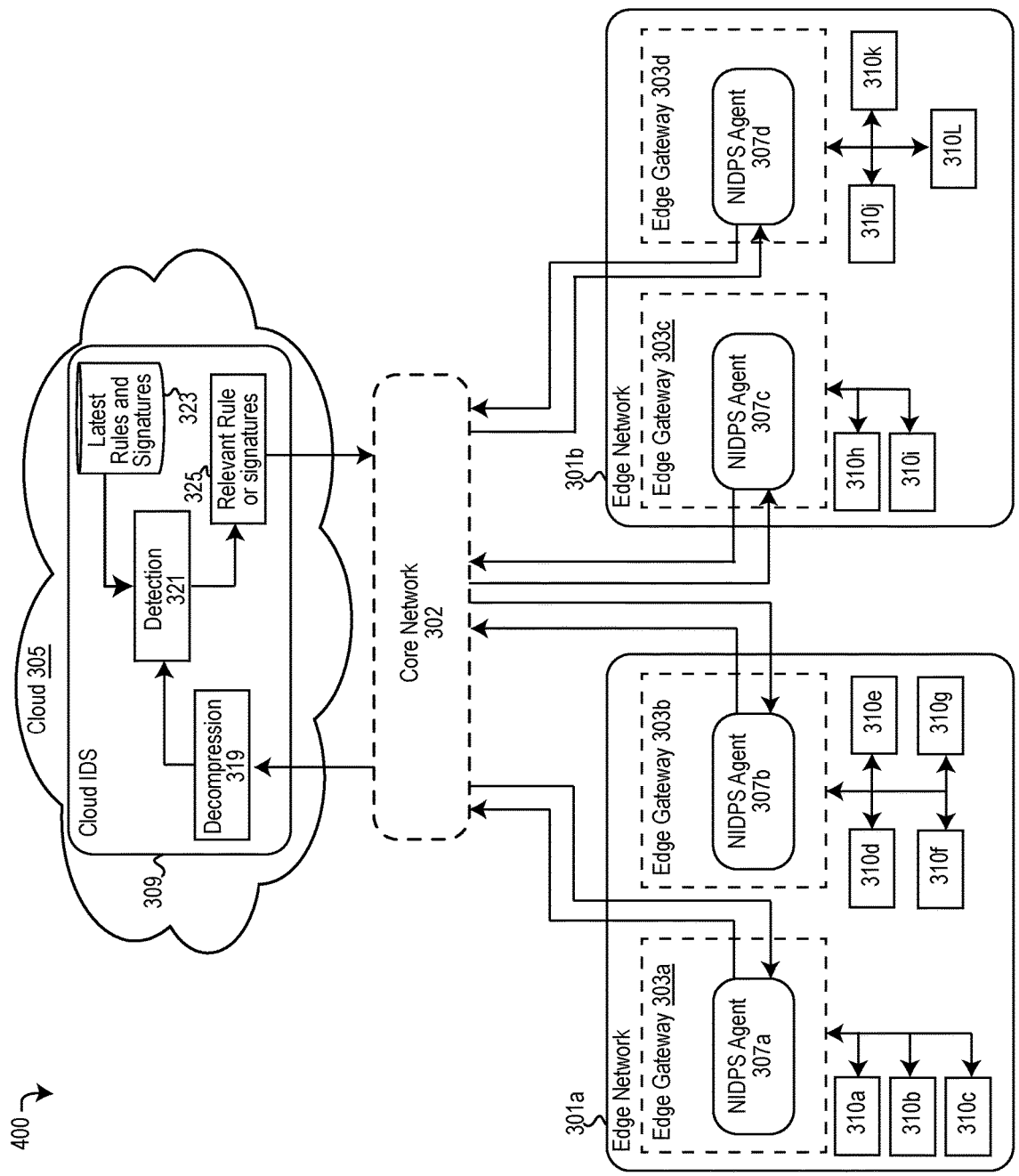
FIG. 4 depicts a functional block diagram describing an alternative embodiment of a system for extending NIDPS to an edge network in a manner that conserves resources of the edge network by sharing rule sets between NIDPS agents of nearby or neighboring gateways, in accordance with the present disclosure.

In some embodiments, the cloud IDS 309 may implement switching NIDPS agents 307 from a first mode to a second mode based on locality and the current operating modes of other NIDPS agents 307 within the same edge network 301 of a location, area or region. For example, in an alternative embodiment of a computing environment 400, shown in FIG. 4, a plurality of edge networks 301a, 301b shown. Each of the edge networks 301a, 301b contain a plurality of edge gateways 303a-303d receiving network traffic from different sets of edge devices 310a-310L, and each of the NIDPS agents 307a-307d provides security services to a corresponding edge gateway 303a-303d. For example, NIDPS agent 307a may provide security services for edge gateway 303a and monitor network traffic generated by edge devices 310a-310c, whereas edge gateways 303b, 303c 303d may receive security services locally from NIDPS agents 307b, 307c and 307d, respectively. NIDPS agent 307b may monitor network traffic from edge devices 310d-310g; NIDPS agent 307c monitors network traffic from edge devices 310h-310i; and NIDPS agent 307d monitors network traffic from edge devices 310j-310L.

Each edge network 301a, 301b may be associated with a different location or region, and as such, the edge gateways 303a-303d within the same edge network 301a, 301b may be neighboring gateways near one another within the region or location. For example, edge gateway 303a and edge gateway 303b may be positioned within the same neighborhood, city, town, etc., whereas edge gateways 303c, 303d residing within edge network 301b, may be positioned further away from edge gateways 303a, 303b in a different location, area or region that is separate or distinct from edge network 301a. In some embodiments, edge gateways 303 that are positioned within the same region or location may adjust the operating mode of the NIDPS agents 307 based on the operating modes of nearby NIDPS agents 307 within the same edge network 301, region, location, area, etc. Each edge gateway 303a-303d may have a locality identified that corresponds to the edge gateway 303 and the NIDPS agent 307 providing security services locally to that edge gateway 303. If cloud IDS 309 keeps detecting security threats or intrusions within different gateways within the same edge network 301 or neighboring edge networks 301a, 301b, cloud IDS 309 may recommend that all local gateways within the same edge network 301 or neighboring locations change from a first operating mode to a second operating mode to match the operating mode of the nearby NIDPS agents 307 currently inspecting packets and detecting security threats at a nearby edge gateway 303.

In some embodiments, locality-base prevention mode may be enforced based on whether or not a nearby or neighboring NIDPS agent 307 has changed operating modes to a prevention mode. For example, If edge gateway 303a-303b are gateways in close proximity to one another, and NIDPS agent 307a of edge gateway 303a is placed into prevention mode, cloud IDS 309 may place NIDPS agent 307*b* into prevention mode and transmit one or more sets of relevant rules or signatures 325 to NIDPS agent 307*b* that are also being enforced by NIDPS agent 307*a*, while NIDPS agents 307*c*, 307*d* may remain in a first "lazy" mode. In other embodiments, cloud IDS 309 may not switch the NIDPS agents 307 within the same location or area from a first mode of operation to a second mode of operation until the number of NIDPS agents 307 within the same edge network 301, region, location, etc. exceeds a threshold number. For example, if the threshold number is a percentage (i.e., at least 20%) of NIDPS agents 307 or an absolute number (i.e., such as 2 out of 5 NIDPS agents 307) operating in the second (preventative) mode of operation, then once the threshold is met or exceeded, cloud IDS may instruct or recommend all NIDPS agents within the edge network 301, region or location to switch to the second mode of operation. For example, if NIDPS agents 307*a*-307*c* are considered in nearby locations and are eligible for enforcing locality-based prevention once the number of NIDPS agents in the preventative mode of operation reaches 50%, if NIDPS agents 307*a* and 307*b* are switched to preventative mode by cloud IDS 309, then cloud IDS may recommend or broadcast a signal to NIDPS agents 307*c*, 307*d* to switch to a preventative operating mode as well and provide NIDPS agents 307*c*, 307*d* with the same rules and signatures being enforced locally by NIDPS agents 307*a*, 307*b*.

In some embodiments, friendly neighboring NIDPS agents 307 may share active sets of rules or signatures with one another directly. For example, in a situation where two edge gateways 303 are near one another, the edge gateways 303 may register as a "friendly neighbor" based on mutual consent between the edge gateways 303, allowing for NIDPS rules and signatures to be shared between the NIDPS agents 307 of the friendly neighbor edge gateways. For example, if edge gateways 303*c*, 303*d* mutually register each other as a friendly neighbor, then upon NIDPS agent 307*c* or NIDPS agent 307*d* being placed into a preventative mode by cloud IDS 309, the other NIDPS agent 307*c*, 307*d* still operating in a first mode may switch to the second mode and receive the set of rules or signatures to enforce from the other NIDPS agent 307. For instance, if NIDPS agent 307*c* is placed into a preventative mode by cloud IDS 309 due to the detection of a security threat, NIDPS agent 307*d* may detect the change in mode or NIDPS agent 307*c* may communicate the change in operation mode to NIDPS 307*d*. Accordingly, in response to being alerted to the change in operation mode of NIDPS 307*c*, NIDPS 307*d* may also switch to a preventative mode of operation and receive the relevant rules and signatures directly from NIDPS agent 307*c* (rather than from cloud IDS 309).

Figure 5:
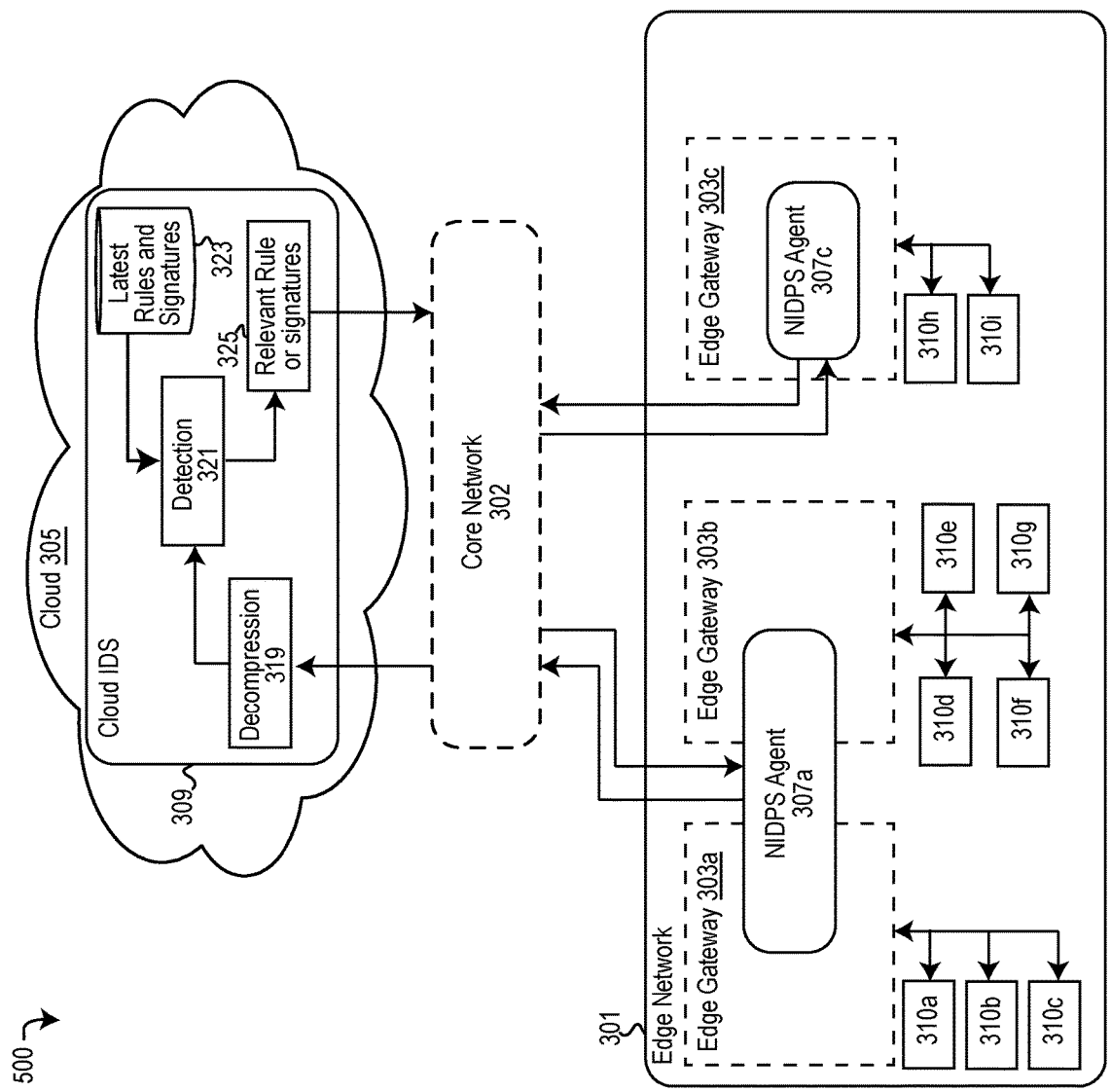
FIG. 5 depicts a functional block diagram describing a second alternative embodiment of a system for extending NIDPS to an edge network in a manner that conserves resources of the edge network comprising two or more co-located gateways sharing an NIDPS agent, in accordance with the present disclosure.

In some embodiments, an NIDPS agent 307 may be shared between two collocated edge computing environments. For example, as shown in the computing environment 500, in some cases a plurality of edge gateways 303 may be monitored by a common NIDPS agent 307. As illustrated in FIG. 5, edge gateway 303*a* and edge gateway 303*b* are monitored by the same NIDPS agent 307*a*. In such an embodiment where an NIDPS agent 307 monitors multiple edge gateways 303, the NIDPS agent 307 may capture packets from all gateways in common and operate in the same mode of operation for all edge gateways regardless of which edge gateway 303 is responsible for receiving the security threat via packets of network traffic trying to enter the gateway. For example, if a security threat originates at edge gateway 303*a* being monitored by NIDPS agent 307*a*, and NIDPS agent 307*a* is placed into a preventative mode of operation, receiving a primary set of rules or signatures to enforce at edge gateway 303*a*, if NIDPS agent 307*a* also monitors edge gateway 303*b*, then once NIDPS agent 307*a* is placed in preventative mode by cloud IDS 309, NIDPS agent 307*a* may also operate in a preventative mode of operation with regards to the network traffic of edge gateway 303*b*; enforcing the same primary set of rules or signatures for the traffic of edge gateway 303*b* as NIDPS agent 307*a* enforced for traffic of edge gateway 303*a*. Upon NIDPS agent 307*a* being switched back to a first mode of operation by cloud IDS 309 and/or one or more rules regarding an interval of time without new threats detected and/or new active rules or signatures being provided to NIDPS agent 307*a*, then NIDPS agent 307*a* may switch back to the first mode of operation and apply the first mode of operation to both edge gateways 303*a* and 303*b*.

Method for Extending NIDPS to an Edge Network

Figure 6:
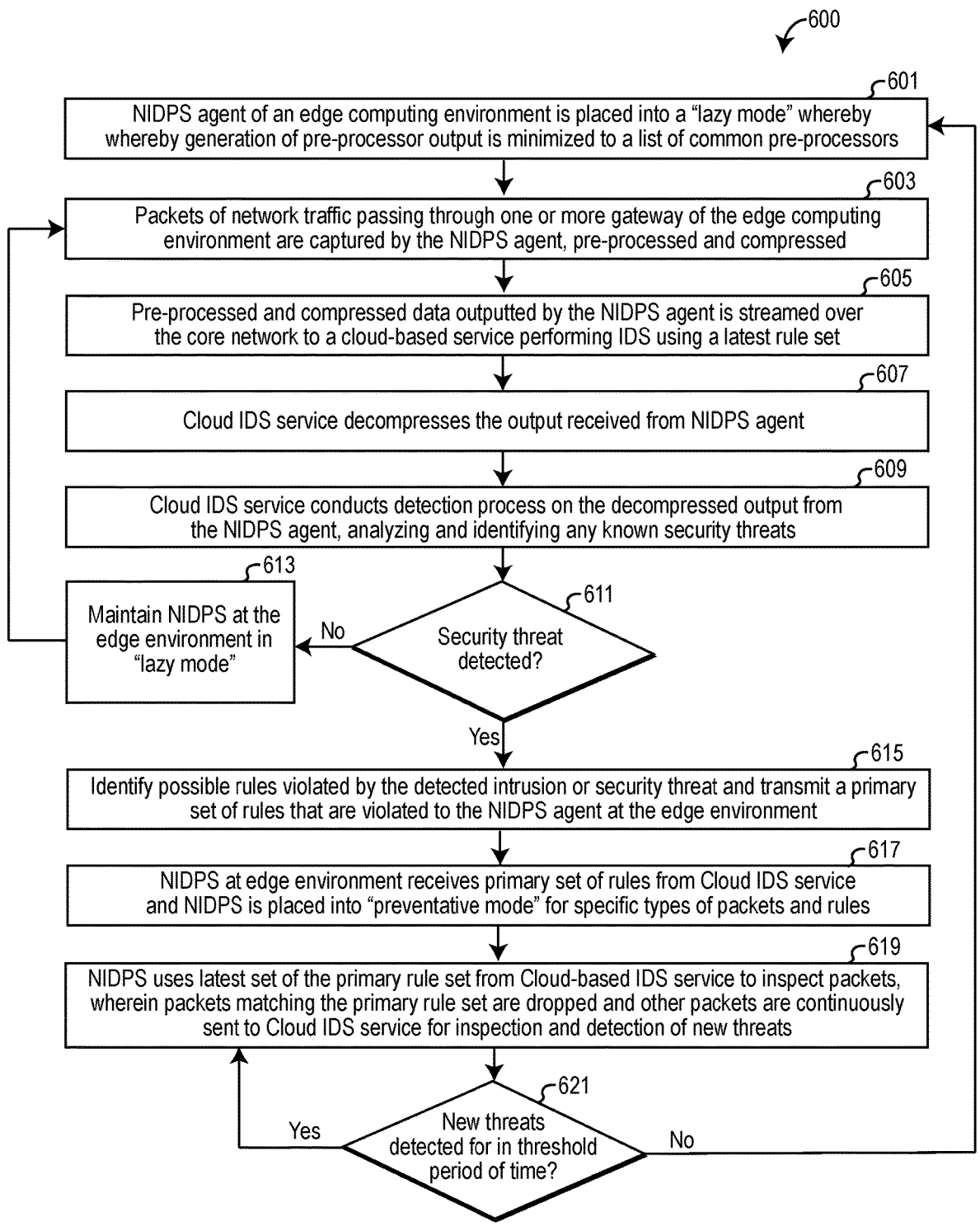
FIG. 6 illustrates a flow diagram describing an embodiment of a method for extending NIDPS to an edge network in a manner that conserves resources of the edge network being monitored, in accordance with the present disclosure.
Figure 7:
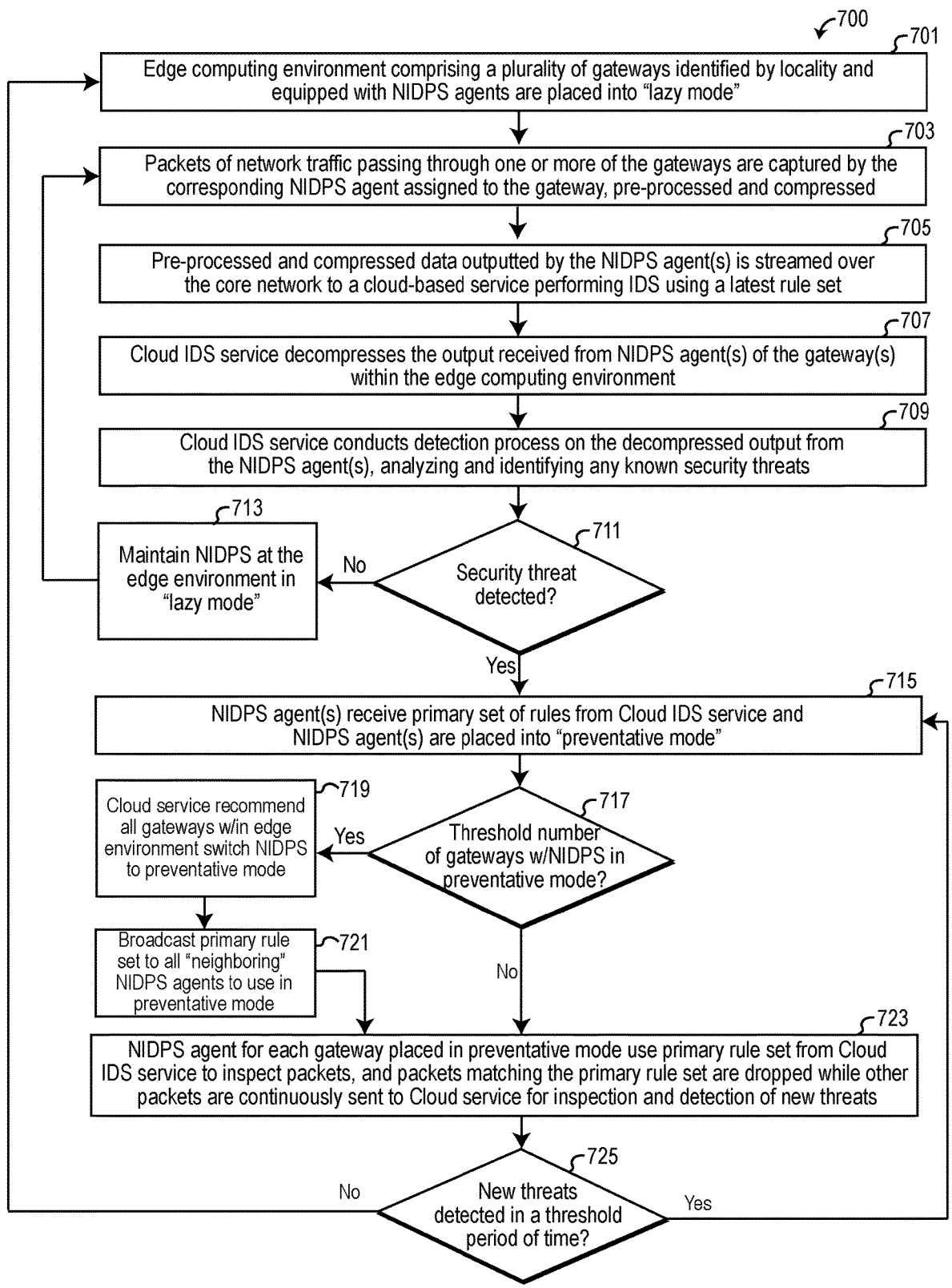
FIG. 7 illustrates a flow diagram describing an alternative embodiment of a method for extending NIDPS to an edge network in a manner that conserves resources of the edge network, in accordance with the present disclosure.
Figure 8:
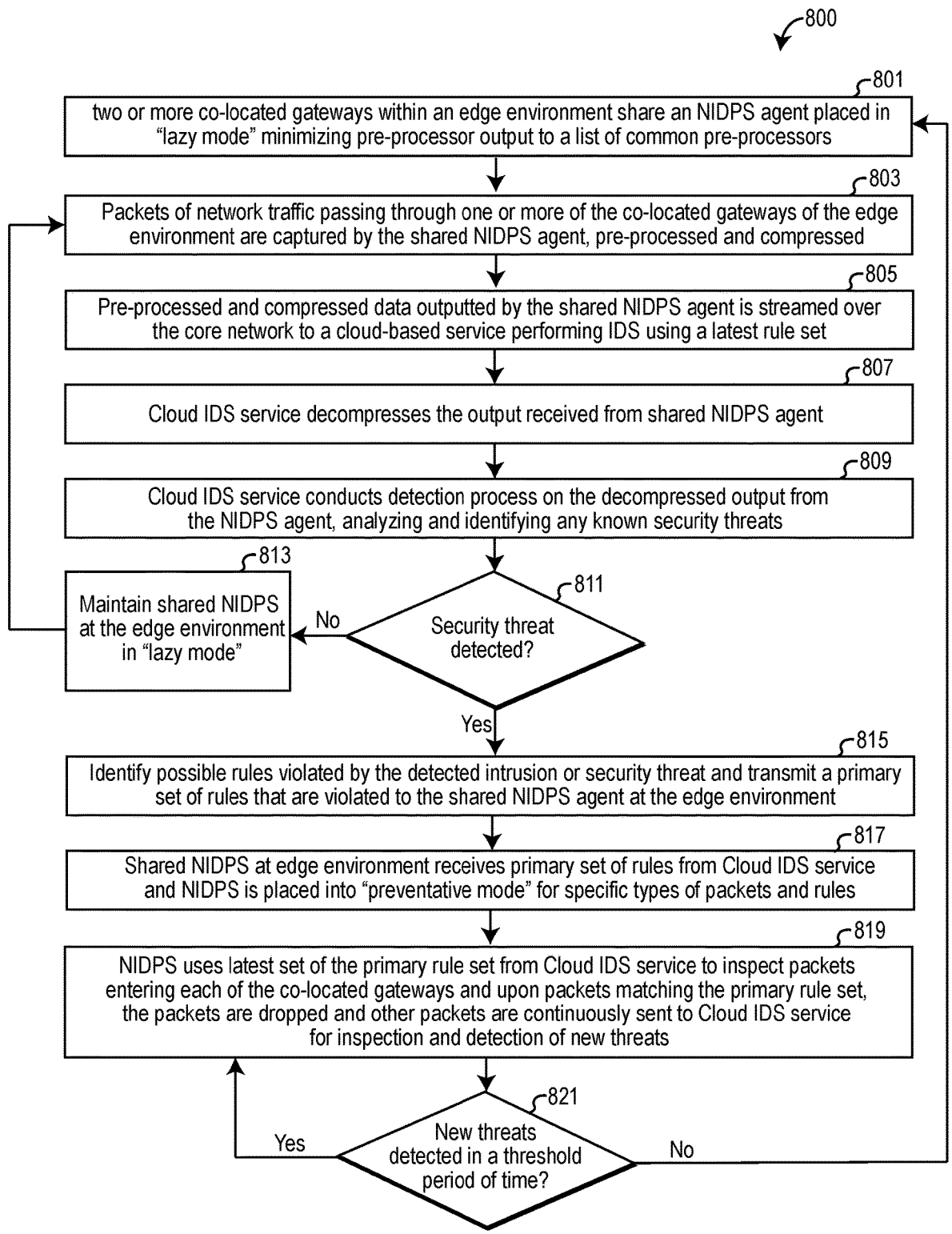
FIG. 8 illustrates a flow diagram describing a second alternative embodiment of a method for extending NIDPS to an edge network in a manner that conserves resources of the edge network, in accordance with the present disclosure.

The drawings of FIGS. 6-8 represent embodiments of methods 600, 700, 800 for extending NIDPS to an edge network. The embodiments of methods 600, 700, 800 can be implemented in accordance with the computing systems and examples depicted in FIGS. 1-5 above and as described throughout this application. A person skilled in the art should recognize that the steps of the methods 600, 700, 800 described in regard to FIGS. 6-8 may be performed in a different order than presented and may not require all the steps described herein to be performed.

The embodiment of method 600, as shown and described in FIG. 6, may begin at step 601. During step 601, an NIDPS agent 307 running security for an edge gateway 303 of an edge network 301 is placed into a first mode (i.e., "lazy mode"). The first mode of the NIDPS agent 307 may minimize the generation of output from IDS pre-processing 313 to a specified list of common pre-processors. For example, data compression, data filtering, data aggregation, and data normalization. The limited types of pre-processing available in the first mode may be configurable, allowing network administrators and architects of the network to add new pre-processors or remove existing pre-processors from the first mode of operation. During step 603, packet capture 311 of NIDPS agent 307 intercepts packets of network traffic being received by the edge gateway 303 from one or more edge devices 310 of the edge network 301. Captured packets are inputted into IDS pre-processing 313 of the NIDPS agent 307 for pre-processing and compression using a lossless compression algorithm. In step 605, the pre-processed output of IDS processing 313 comprising the lossless compression 315 of the pre-processed packets of network traffic is streamed over the core network 302 to cloud IDS 309 hosted by cloud 305, whereby the pre-processed data packets can be inspected and analyzed for security threats using the latest rule sets and signatures available to cloud IDS 309.

In step 607 of method 600, cloud IDS 307 decompresses the pre-preprocessed data packets received from the NIDPS agent 307, returning the packets to their uncompressed form. During step 609, cloud IDS 307 analyzes the uncompressed packets for security threats and identifies any known threats described by one or more rules or signatures stored by the cloud IDS 309. Identification of known threats may be performed by matching any security threats exemplified within the data packets to the latest rules and signatures 323 database. In step 611, a determination is made whether a security threat has been detected by cloud IDS 309. If a security threat is not identified and matched using an existing rule or signature to the uncompressed packets of network traffic being analyzed, method 600 may proceed to step 613. During step 613, cloud IDS 309 may maintain NIDPS agent 307 in the first mode of operation at the edge network 301, and the NIDPS agent 307 may continue to capture and pre-process packets of network traffic reaching the edge gateway 303 in a manner consistent with steps 603. The NIDPS agent 307 may stream the compressed and pre-processed packets to cloud IDS 309 for analysis and detection of security threats. If, on the other hand, in step 611 a security threat is detected based on the analysis of cloud IDS 309 using the latest rules and signatures 323, the method 600 may proceed to step 615.

During step 615 of method 600, cloud IDS 309 identifies the possible rules violated or signatures present within packets of network traffic analyzed during step 609, which may indicate an intrusion or possible security threat to the network and devices thereof. Cloud IDS 309 may alert the corresponding NIDPS agent 307 of the potential intrusion or security threat, identify the possible rules that may have been violated and transmit a primary set of relevant rules and/or signatures 325 that should actively be enforced by the NIDPS agent 307 at the edge gateway 303. During step 617, NIDPS agent 307 receives the primary set of relevant rules and/or signatures 325 from cloud IDS 309. In response to receiving the active ruleset to be enforced at edge gateway 303, the NIDPS agent 307 may change mode of operations from the first "lazy" mode of operation to a second "preventative" mode of operation enforcing the primary set of rules and/or signatures 325 for specific types of packets that are inspected and determined to violate the rules or signatures actively being enforced.

During step 619, the NIDPS agent 307 operating in preventative mode inspects incoming packets of network traffic being received by edge gateway 303. The NIDPS agent 307 may perform deep packet inspection of the incoming packets right at the edge network 301 and using the primary set of rules and/or signatures 325, match potential threats found within the incoming packets to the relevant rules and/or signatures 325 provided to NIDPS agent 307 by cloud IDS 309. Packets inspected by NIDPS agent 307 which match a rule or signature within the primary set of rules and/or signatures being enforced may be dropped or omitted from the network traffic entering the edge gateway 303. In some embodiments, the edge device 310 transmitting the packets violating one of the rules or signatures being actively enforced, may be quarantined from the rest of the edge devices 310 of the edge network 301. Incoming packets received and/or inspected by NIDPS agent 307 which do not violate the primary rule set being enforced at the edge gateway 303 continue to be pre-processed, compressed using a lossless compression algorithm and streamed to cloud IDS 309 for further analysis and detection of new security threats.

During step 621, the NIDPS agent 307 and/or cloud IDS 309 may periodically determine whether or not new threats have occurred and/or violations of the primary set of rules being enforced at the edge gateway 303 have been identified for at least a threshold period of time. If new threats have been detected by the cloud IDS 309 or the primary set of rules and/or signatures being actively enforced by the NIDPS agent 307 has continued to find one or more security threat within the threshold period of time (the "yes" branch), method 600 may return to step 619, wherein the NIDPS agent 307 continues to remain in preventative mode, inspecting packets for violations of the primary set of rules or signatures being enforced at the edge gateway 303 and omit or drop any packets that violate the rules or signatures. Conversely, if during step 621 new security threats are not detected by cloud IDS 309 within a threshold period of time, and the NIDPS agent 307 does not detect any ongoing violations of the primary set of rules or signatures being enforced at the edge gateway 303 (the "no branch"), the method may proceed back to step 601, wherein the NIDPS agent 307 is placed back into the first "lazy" mode of operation and ceases enforcement of the primary set of rules or signatures at the edge gateway 303. Instead, capturing packets, pre-processing and compressing the packets, then streaming the packets to cloud IDS 309 for analysis and detection of security threats.

The embodiment of method 700, as shown and described in FIG. 7, may be considered an alternative embodiment or series of steps that augment the method 600 of FIG. 6, wherein there may be edge networks 301 comprising a plurality of edge gateways 303 which can be grouped together or identified by locality or region to provide locality based preventative mode as new security threats are identified. Method 700 may begin at step 701. During step 701, the edge computing environments comprising a plurality of edge gateways 303 may be identified by locality, region or area. The edge gateways 303 may each be running an NIDPS agent 307 placed into a first "lazy" mode. The first mode of the NIDPS agent 307 may minimize the generation of output from IDS pre-processing 313 to a specified list of common pre-processors such as data compression, data filtering, data aggregation, and data normalization. The limited types of pre-processing available in the first mode may be configurable, allowing network administrators and architects of the network to add new pre-processors or remove existing pre-processors from the first mode of operation. During step 703, packets of network traffic received by one or more of the edge gateways may be intercepted and captured by packet capture 311 of the respective NIDPS agent 307 responsible for monitoring the corresponding edge gateway 303 receiving the packets. Captured packets are inputted into IDS pre-processing 313 of the NIDPS agent 307 for pre-processing and compression using a lossless compression algorithm. In step 705, the pre-processed output of IDS processing 313 comprising the lossless compression of the pre-processed packets of network traffic is streamed over the core network 302 to cloud IDS 309 hosted by cloud 305, whereby the pre-processed data packets can be inspected and analyzed for security threats using the latest rule sets and signatures available to cloud IDS 309.

In step 707 of method 700, cloud IDS 307 decompresses the pre-preprocessed data packets received from one or more of the NIDPS agents 307, returning the packets to their uncompressed form. During step 709, cloud IDS 307 analyzes the uncompressed packets for security threats and identify known threats described by one or more rules or signatures stored by the cloud IDS 309 by matching any security threats exemplified within the data packets to the latest rules and signatures 323 database. In step 711, a determination is made whether a security threat originating from one or more of the edge gateways 303 has been detected by cloud IDS 309. If a security threat is not identified and matched using an existing rule or signature to the uncompressed packets of network traffic being analyzed, method 700 may proceed to step 713. During step 713, cloud IDS 309 may maintain NIDPS agents 307 in the first mode of operation at the edge network 301. The plurality of NIDPS agents 307 may continue to capture and pre-process packets of network traffic reaching their corresponding edge gateways 303 in a manner consistent with steps 703 and stream the compressed and pre-processed packets to cloud IDS 309 for analysis and detection of security threats. Conversely, if during step 711 a security threat is detected based on the analysis of cloud IDS 309 using the latest rules and signatures 323, the method 700 may proceed to step 715.

During step 715 of method 700, cloud IDS 309 identifies the possible rules violated or signatures present within packets of network traffic analyzed during step 709, which may indicate an intrusion or possible security threat to the network and devices thereof. Cloud IDS 309 may alert the corresponding NIDPS agent 307 of the potential intrusion or security threat, identify the possible rules that may have been violated and transmit to the NIDPS agent 307, a primary set of relevant rules and/or signatures 325 that should actively be enforced by the NIDPS agent 307. The NIDPS agent 307 receives the primary set of relevant rules and/or signatures 325 from cloud IDS 309. In response to receiving the active ruleset to be enforced at edge gateway 303, the NIDPS agent 307 may change mode of operations from the first "lazy" mode of operation to a second "preventative" mode of operation enforcing the primary set of rules and/or signatures 325 for specific types of packets that are inspected and determined to violate the rules or signatures actively being enforced.

During step 717, a determination may be made by cloud IDS 309 whether or not a threshold number of edge gateways within a particular locality or edge network 301 are currently running a corresponding NIDPS agent 307 in preventative mode. If the number of NIDPS agents 307 within the same location, area, region, edge network 301, etc., are above a threshold number or pre-set percentage of NIDPS agents 307, the method 700 may proceed to step 719. During step 719, in response to the locality or edge network 301 having a certain number of NIDPS agents 307 running in preventative mode and enforcing the primary rule set or signatures, the cloud IDS 309 may recommend all edge gateways 303 within the same edge network 301 and/or locality, region or area switch their corresponding NIDPS agents 307 to preventative mode, so they are all actively enforcing the same primary rule set or signatures across the entire edge network 301 or location. In step 721, cloud IDS 309 broadcasts the primary rule set and/or signatures being enforced by the threshold number of NIDPS agents 307 within the same edge network 301, region, locality, etc., to all NIDPS agents 307 within the same edge network 301, region, etc. Conversely, referring back to step 717, if a threshold number of gateways do not have their corresponding NIDPS agents 307 placed in preventative mode, the method 700 may proceed directly to 717 whereby a primary rule set received from the cloud IDS 309 may be enforced by those NIDPS agents 307 that are in preventative mode.

In step 723, NIDPS agents 307 for each edge gateway 303 that has placed the NIDPS agents 307 into preventative mode uses the primary set of rules or signatures received from the cloud IDS service to actively inspect packets and enforce the rules or signatures. Each of the NIDPS agents 307 operating in preventative mode inspect incoming packets of network traffic being received at their corresponding edge gateways 303. The NIDPS agents 307 may perform deep packet inspection of the incoming packets right at the edge network 301 and using the primary set of rules and/or signatures 325, match potential threats found within the incoming packets to the relevant rules and/or signatures 325 provided to NIDPS agents 307 by cloud IDS 309. Packets inspected by NIDPS agents 307 which match a rule or signature within the primary set of rules and/or signatures being enforced, may be dropped or omitted from the network traffic entering the edge gateways 303. In some embodiments, the edge device 310 transmitting the packets violating one of the rules or signatures being actively enforced may be quarantined from the rest of the edge devices 310 of the edge network 301. Incoming packets received and/or inspected by NIDPS agents 307 which do not violate the primary rule set being enforced at the edge gateways 303 for the edge network 301 or locality can continue to be pre-processed, compressed using a lossless compression algorithm and streamed to cloud IDS 309 for further analysis and detection of new security threats.

During step 725, the NIDPS agents 307 placed into preventative mode and/or cloud IDS 309 may periodically determine whether or not new threats have occurred and/or violations of the primary set of rules being enforced at the edge gateways 303 have been identified for at least a threshold period of time. If new threats have been detected by the cloud IDS 309 for the edge network 301, the location, region, etc., and/or the primary set of rules and/or signatures being actively enforced by the plurality of NIDPS agents 307 has continued to find one or more security threats within the threshold period of time (the "yes" branch), method 700 may return to step 715, wherein the NIDPS agents 307 for the edge network 301, the locality, region, etc., continues to remain in preventative mode, inspecting packets for violations of the primary set of rules or signatures being enforced at their corresponding edge gateways 303 and omit or drop any packets that violate the rules or signatures. Conversely, if during step 725, new security threats are not detected by cloud IDS 309 within the edge network, locality, region, etc., for a threshold period of time, and the plurality of NIDPS agents 307 for the location or edge network 301 being monitored, does not detect any ongoing violations of the primary set of rules or signatures being enforced at the edge gateways 303 (the "no branch"), the method may proceed back to step 701, wherein all of the NIDPS agents 307 within the edge network 301 or identified locality are placed back into the first "lazy" mode of operation and cease enforcement of the primary set of rules or signatures at each of the edge gateways 303. Instead, NIDPS agents 307 for the edge network 301 or identified locality continue to capture packets, pre-process and compress the packets, then stream the packets to cloud IDS 309 for analysis and detection of security threats.

The embodiment of method 800, as shown and described in FIG. 8, may be considered an alternative embodiment or a series of steps that may augment the method 600 of FIG. 6, wherein two or more collocated edge gateways 303 share an NIDPS agent 307 providing security functions and features for more than one gateway 303 which the NIDPS agent 307 provides services. Method 800 may begin at step 801. During step 801, an NIDPS agent 307 running security for two or more collocated edge gateways 303 of an edge network 301 sharing the NIDPS agent 307, is placed into a first mode (i.e., "lazy mode"). The first mode of the NIDPS agent 307 may minimize the generation of output from IDS pre-processing 313 to a specified list of common pre-processors. The limited types of pre-processing available in the first mode to the two or more edge gateways 303, and may be configurable, allowing network administrators and architects of the network to add new pre-processors or remove existing pre-processors from the first mode of operation. During step 803, packet capture 311 of NIDPS agent 307 intercepts packets of network traffic being received by each of the two or more edge gateways 303 from one or more edge devices 310 connected to a respective edge gateway 303 within the edge network 301. Captured packets at any of the collocated edge gateways 303 are inputted into IDS pre-processing 313 of the NIDPS agent 307 for pre-processing and compression using a lossless compression algorithm. In step 805, the pre-processed output of IDS processing 313 comprising the lossless compression of the pre-processed packets of network traffic is streamed over the core network 302 to cloud IDS 309 hosted by cloud 305, whereby the pre-processed data packets can be inspected and analyzed for security threats using the latest rule sets and signatures available to cloud IDS 309.

In step 807 of method 600, cloud IDS 307 decompresses the pre-preprocessed data packets received from the NIDPS agent 307, returning the packets to their uncompressed form. During step 809, cloud IDS 307 analyzes the uncompressed packets for security threats and identify known threats described by one or more rules or signatures stored by the cloud IDS 309 by matching any security threats exemplified within the data packets to the latest rules and signatures 323 database. In step 811, a determination is made whether a security threat has been detected by cloud IDS 309. If a security threat is not identified and matched using an existing rule or signature to the uncompressed packets of network traffic being analyzed, method 800 may proceed to step 813. During step 813, cloud IDS 309 may maintain NIDPS agent 307 in the first mode of operation at the edge network 301 for all edge gateways 303 that the NIDPS agent 307 may provide security. The NIDPS agent 307 may continue to capture and pre-process packets of network traffic reaching each of the edge gateways 303 in a manner consistent with steps 803 and stream the compressed and pre-processed packets to cloud IDS 309 for analysis and detection of security threats. If, on the other hand, in step 811 a security threat is detected based on the analysis of cloud IDS 309 using the latest rules and signatures 323, the method 800 may proceed to step 815.

During step 815 of method 800, cloud IDS 309 identifies the possible rules violated or signatures present within packets of network traffic analyzed during step 809, which may indicate an intrusion or possible security threat to the network and devices thereof. Cloud IDS 309 may alert the corresponding NIDPS agent 307 of the potential intrusion or security threat, identify the possible rules that may have been violated and transmit a primary set of relevant rules and/or signatures 325 that should actively be enforced by the NIDPS agent 307. During step 817, the shared NIDPS agent 307 receives the primary set of relevant rules and/or signatures 325 from cloud IDS 309. In response to receiving the active ruleset to be enforced at edge gateway 303, the shared NIDPS agent 307 may change mode of operations from the first "lazy" mode of operation to a second "preventative" mode of operation, enforcing the primary set of rules and/or signatures 325 for specific types of packets that are inspected and determined to violate the rules or signatures actively being enforced.

During step 819, the shared NIDPS agent 307 operating in preventative mode inspects incoming packets of network traffic being received by each of the collocated edge gateways 303 the NIDPS agent provides security service. The NIDPS agent 307 may perform deep packet inspection of the incoming packets right at the edge network 301 and using the primary set of rules and/or signatures 325, match potential threats found within the incoming packets to the relevant rules and/or signatures 325 provided to NIDPS agent 307 by cloud IDS 309. Packets inspected by NIDPS agent 307 which match a rule or signature within the primary set of rules and/or signatures being enforced may be dropped or omitted from the network traffic entering any of the collocated edge gateways 303. In some embodiments, the edge device(s) 310 transmitting the packets violating one or more of the rules or signatures being actively enforced may be quarantined from the rest of the edge devices 310 of the edge network 301. Incoming packets received and/or inspected by NIDPS agent 307 which do not violate the primary rule set being enforced at any of the collocated edge gateways 303 may continue to be pre-processed, compressed using a lossless compression algorithm and streamed to cloud IDS 309 for further analysis and detection of new security threats.

During step 821, the shared NIDPS agent 307 and/or cloud IDS 309 may periodically determine whether or not new threats have occurred and/or violations of the primary set of rules being enforced at the collocated edge gateways 303 have been identified for at least a threshold period of time. If new threats have been detected by the cloud IDS 309 or the primary set of rules and/or signatures being actively enforced by the NIDPS agent 307 has continued to find one or more security threat within the threshold period of time (the "yes" branch), method 800 may return to step 819, wherein the NIDPS agent 307 continues to remain in preventative mode, inspecting packets for violations of the primary set of rules or signatures being enforced at the collocated edge gateways 303 and omit or drop any packets that violate the rules or signatures actively being enforced. Conversely, if during step 821 new security threats are not detected by cloud IDS 309 within a threshold period of time, and the NIDPS agent 307 does not detect any ongoing violations of the primary set of rules or signatures being enforced at any of the collocated edge gateways 303 (the "no branch"), the method may proceed back to step 801, wherein the NIDPS agent 307 is placed back into the first "lazy" mode of operation and ceases enforcement of the primary set of rules or signatures at collocated edge gateways 303. Instead, simply capturing packets, pre-processing and compressing the packets, for each of the two or more collocated gateways, and streaming the packets to cloud IDS 309 for analysis and detection of security threats.

What is claimed is:

1. A computer-implemented method for extending Network Intrusion Detection and Prevention Systems (NIDPS) to an edge network, the computer-implemented method comprising:

capturing, by an NIDPS agent of a gateway within the edge network, packets of network traffic passing through the gateway while the NIDPS agent is placed into a first mode reducing pre-processor output of the NIDPS agent;

pre-processing, by the NIDPS agent, the packets of network traffic;

compressing, by the NIDPS agent, output of the pre-processing of the packets of network traffic using lossless compression;

transmitting, by the NIDPS agent, compressed pre-processed packets of the network traffic to a cloud intrusion detection service (IDS);

upon detection of a security threat by the cloud IDS, receiving, by the NIDPS agent, an alert indicating possible rules being violated and a set of rules or signatures from the cloud IDS; and switching the NIDPS agent to a second mode, wherein while in the second mode, the NIDPS agent prevents transmission of certain types of packets corresponding to the set of rules or signatures from passing through the gateway; and wherein the NIDPS agent of the gateway further operates as an NIDPS agent of a second gateway within the edge network, whereby the NIDPS agent placed in the first mode, or the second mode applies to both the gateway and the second gateway, and the NIDPS agent shares the set of rules or signatures from the cloud IDS with the gateway and the second gateway.

2. The computer-implemented method of claim 1, further comprising:
inspecting, by the NIDPS agent placed in the second mode, the packets of network traffic;
matching, by the NIDPS agent placed in the second mode, one or more of the packets of network traffic to the set of rules or signatures; and
dropping, by the NIDPS agent placed in the second mode, the one or more of the packets of network traffic that match the set of rules or signatures.

3. The computer-implemented method of claim 2, wherein remaining packets of network traffic that do not match the set of rules or signatures continue to be pre-processed, compressed and transmitted to the cloud IDS while the NIDPS agent is in the second mode.

4. The computer-implemented method of claim 2, wherein the NIDPS agent is placed into the second mode for a configurable interval of time; and
upon the NIDPS agent not matching one or more of the packets of network traffic to the set of rules or signatures, or the cloud IDS alerting the NIDPS agent of possible rules being violated for the configurable interval of time, switching the NIDPS agent from the second mode to the first mode.

5. The computer-implemented method of claim 1, further comprising:
wherein the edge network includes a plurality of gateways positioned within a common location or region, and a plurality of NIDPS agents assigned to monitor the packets of network traffic passing through the plurality of gateways;
upon a threshold number of the plurality of NIDPS agents switching from the first mode to the second mode, switching all NIDPS agents of the plurality of NIDPS agents within the common location or region of the edge network to the second mode; and
broadcasting the set of rules or signatures from the cloud IDS to all of the NIDPS agents within the common location or region of the edge network.

6. The computer-implemented method of claim 5, wherein the plurality of NIDPS agents are placed into the second mode for a configurable interval of time;
upon one or more of the plurality of NIDPS agents not matching one or more of the packets of network traffic to the set of rules or signatures, or the cloud IDS alerting the one or more NIDPS agents of possible rules being violated for the configurable interval of time, switching the one or more NIDPS agent from the second mode to the first mode; and
upon a threshold number of the plurality of NIDPS agents switching from the second mode back to the first mode, switching all of the plurality of NIDPS agents to the first mode.

7. A computer-implemented method for extending Network Intrusion Detection and Prevention Systems (NIDPS) to an edge network, the computer-implemented method comprising:
capturing, by an NIDPS agent of a gateway within the edge network, packets of network traffic passing through the gateway while the NIDPS agent is placed into a first mode reducing pre-processor output of the NIDPS agent, wherein the edge network includes a plurality of gateways positioned within a common location or region, and a plurality of NIDPS agents assigned to monitor the packets of network traffic passing through the plurality of gateways;
pre-processing, by the NIDPS agent, the packets of network traffic;
compressing, by the NIDPS agent, output of the pre-processing of the packets of network traffic using lossless compression;
transmitting, by the NIDPS agent, compressed pre-processed packets of the network traffic to a cloud intrusion detection service (IDS);
upon detection of a security threat by the cloud IDS, receiving, by the NIDPS agent, an alert indicating possible rules being violated and a set of rules or signatures from the cloud IDS;
switching the NIDPS agent to a second mode, wherein while in the second mode, the NIDPS agent prevents transmission of certain types of packets corresponding to the set of rules or signatures from passing through the gateway;
upon a threshold number of the plurality of NIDPS agents switching from the first mode to the second mode, switching all NIDPS agents of the plurality of NIDPS agents within the common location or region of the edge network to the second mode; and
broadcasting the set of rules or signatures from the cloud IDS to all of the NIDPS agents within the common location or region of the edge network.

8. The computer-implemented method of claim 7, further comprising:
inspecting, by the NIDPS agent placed in the second mode, the packets of network traffic;
matching, by the NIDPS agent placed in the second mode, one or more of the packets of network traffic to the set of rules or signatures; and
dropping, by the NIDPS agent placed in the second mode, the one or more of the packets of network traffic that match the set of rules or signatures.

9. The computer-implemented method of claim 8, wherein remaining packets of network traffic that do not match the set of rules or signatures continue to be pre-processed, compressed and transmitted to the cloud IDS while the NIDPS agent is in the second mode.

10. The computer-implemented method of claim 8, wherein the NIDPS agent is placed into the second mode for a configurable interval of time; and
upon the NIDPS agent not matching one or more of the packets of network traffic to the set of rules or signatures, or the cloud IDS alerting the NIDPS agent of possible rules being violated for the configurable interval of time, switching the NIDPS agent from the second mode to the first mode.

11. The computer-implemented method of claim 7, wherein the plurality of NIDPS agents are placed into the second mode for a configurable interval of time.

12. A computer-implemented method for extending Network Intrusion Detection and Prevention Systems (NIDPS) to an edge network, the computer-implemented method comprising:
capturing, by an NIDPS agent of a gateway within the edge network, packets of network traffic passing through the gateway while the NIDPS agent is placed into a first mode reducing pre-processor output of the NIDPS agent;
pre-processing, by the NIDPS agent, the packets of network traffic;

compressing, by the NIDPS agent, output of the pre-processing of the packets of network traffic using lossless compression;

transmitting, by the NIDPS agent, compressed pre-processed packets of the network traffic to a cloud intrusion detection service (IDS);

upon detection of a security threat by the cloud IDS, receiving, by the NIDPS agent, an alert indicating possible rules being violated and a set of rules or signatures from the cloud IDS;

switching the NIDPS agent to a second mode, wherein while in the second mode, the NIDPS agent prevents transmission of certain types of packets corresponding to the set of rules or signatures from passing through the gateway;

inspecting, by the NIDPS agent placed in the second mode, the packets of network traffic;

matching, by the NIDPS agent placed in the second mode, one or more of the packets of network traffic to the set of rules or signatures; and dropping, by the NIDPS agent placed in the second mode, the one or more of the packets of network traffic that match the set of rules or signatures.

13. The computer-implemented method of claim 12, wherein the NIDPS agent is placed into the second mode for a configurable interval of time.

14. The computer-implemented method of claim 11, wherein upon one or more of the plurality of NIDPS agents not matching one or more of the packets of network traffic to the set of rules or signatures, or the cloud IDS alerting the one or more NIDPS agents of possible rules being violated for the configurable interval of time, switching the one or more NIDPS agent from the second mode to the first mode.

15. The computer-implemented method of claim 14, wherein upon a threshold number of the plurality of NIDPS agents switching from the second mode back to the first mode, switching all of the plurality of NIDPS agents to the first mode.

16. The computer-implemented method of claim 13, wherein upon the NIDPS agent not matching one or more of the packets of network traffic to the set of rules or signatures, or the cloud IDS alerting the NIDPS agent of possible rules being violated for the configurable interval of time, switching the NIDPS agent from the second mode to the first mode.

* * * * *